Nov. 10, 1931.                J. W. SMITH                1,831,147
                              CUP CAKE PAN
                           Filed March 14, 1930
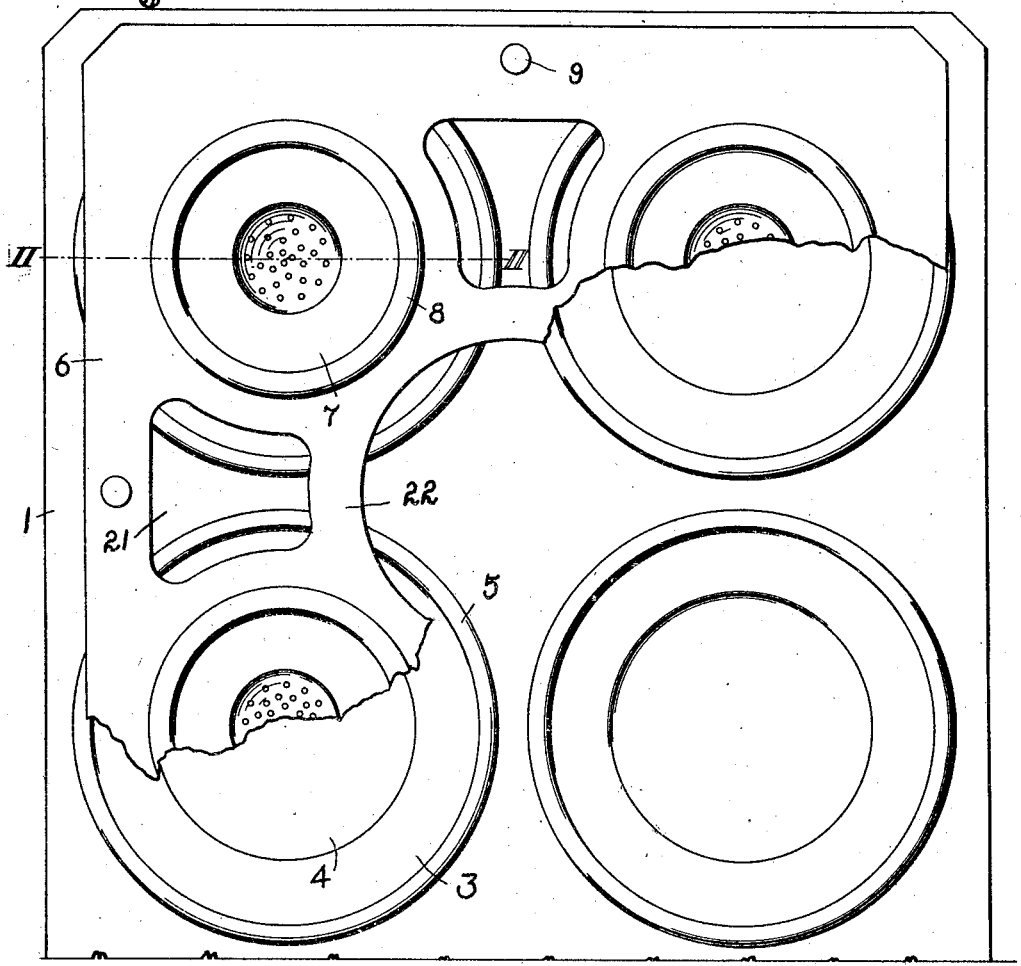
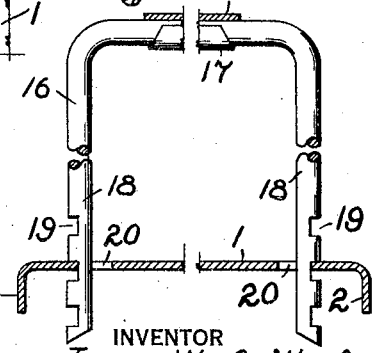
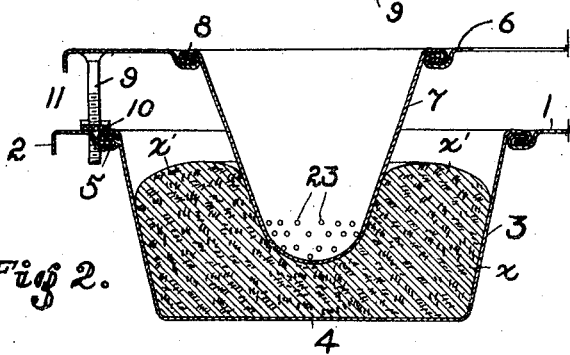
INVENTOR
James W. Smith
ATTORNEY Patented Nov. 10, 1931

1,831,147

UNITED STATES PATENT OFFICE

JAMES W. SMITH, OF SAN FRANCISCO, CALIFORNIA

CUP CAKE PAN

Application filed March 14, 1930. Serial No. 435,741.

This invention relates to improvements in cup cake pans.

Among the objects of the invention is to provide a simple and effective means for forming cup cakes with a top depression to receive a filler.

Another object is to apply the present invention as an attachment to the conventional cup cake pan.

Other objects and advantages will appear as the description progresses.

In this specification and the accompanying drawings, the invention is disclosed in its preferred form. But it is to be understood that it is not limited to this form because it may be embodied in other forms. It is also to be understood that in and by the claims following the description it is desired to cover the invention in whatsoever form it may be embodied.

In the one sheet of drawings:

Fig. 1 is a diagrammatic plan view of a cup cake pan constructed in accordance with this invention, certain of the parts being broken away to better disclose the relation of parts.

Fig. 2 is a vertical fragmentary section of the same taken on the line II—II.

Fig. 3 is a detail plan view of the latch for the core supports.

Fig. 4 is a detail in elevation of a modified form of core support.

In detail the construction illustrated in the drawings comprises the cup cake pan, having the top plate 1, with the edges 2 flanged downward for rigidity and finish.

The tapered cake cups 3 having the flat bottoms 4 have their top edges 5 crimped into holes provided at interspaced intervals in the top plate 1. This is substantially the conventional cup cake pan.

In combination therewith is the core support 6, which may be similar in construction to the cake pan above described. The tapered cores 7 are crimped into this plate at 8. These cores are coaxial with the cake cups 3 and depend thereinto, see Fig. 3.

The core plate has the threaded supports 9 fixed thereto at interspersed points, to engage registering sockets in the plate 1. The supports have the running nuts 10 threaded thereon, to support the core plate 6 an adjusted distance above the top plate 1.

These two plates are held in fixed spaced relation by the latches 11, having the notched ends 12 engaging the supports 9 above the nuts 10. The slots 13 in the latches permit a sliding engagement under the heads 14 of the studs fixed in the plate 1. These latches can be moved into and out of engagement by the turned-up ends 15.

A modified form of support is shown in Fig. 4, in which a U shaped wire 16 is held within the curled edge 17 of the core plate 6. The opposite extensions 18—18 are notched at 19—19 to engage the sockets 20 in the top plate 1. The notches can be disengaged by springing the extensions 18—18 together.

The invention operates substantially as follows: The proper amount of cake or other suitable dough is placed in the plurality of cups 3; the supports 9 are then entered into the sockets in the top plate 1, and the latches 11 slid into position.

The assembly is then placed in a bake oven, in the usual manner. As the cakes X raise, they take the internal shape of the cups 6 and the external shape of the cores 7, which forms a central depression or recess in the tops of the cup cakes. The "spring" of the baking dough at X' preserves the natural crust finish, adding to the attractiveness of the finished product, when the central depression is filled with jelly, creams, or the like.

The depth of the depression is regulated by adjusting the running nuts 10.

Certain dough mixes tend to fall, or lose their spring if they contact obstructions. This effect is minimized by providing the vents 23 in the bottoms of the cores 7, which relieves the internal pressure and permits the rise of gas bubbles in the dough beneath the cores.

A similar result in venting the cores can be accomplished by vertically fluting or corrugating the walls of the cores 7, much as the spout of a funnel is fluted for the escape of impounded air.

The top plate is cut away between the cores as at 21, leaving the connecting bars or grids 22 to support the cores 7. These grids may be flanged down at the edges for greater strength. This is desirable to permit direct top oven heat to reach the cakes to brown the top crust X'.

It will be obvious to those skilled in the art that the cores 7 may be individually attached to one or more cups 3, instead of being assembled on the core plate as shown, and the plates 1 and 6 spaced apart by means other than shown, without departing from the spirit of the invention.

Having thus described this invention, what is claimed and desired to secure by Letters Patent is:

1. A cake pan comprising a top plate having a plurality of cups therein, a core plate above said top plate and being open at the sides and top and having a core with a spheroidal bottom extending into said cup, said bottom having perforations therein, supports fixed to said core plate and engaging said top plate, and latches on said top plate engaging said supports.

2. A cake pan comprising a top plate having a plurality of cups therein, a core plate above said top plate and open at the sides and top and having cores with spheriodal bottoms extending into said cups, said bottoms having perforations therein, and supports fixed to said core plate and engaging said bottom plate.

In testimony whereof I have hereunto set my hand this 7th day of March, 1930.

JAMES W. SMITH.